United States Patent Office 3,458,536
Patented July 29, 1969

3,458,536
CONTINUOUS PROCESS FOR PREPARING EPOXIDIZED ORGANIC COMPOUNDS WHICH INVOLVES MORE THAN ONE REACTION ZONE
William E. Setzler, Jr., Seaford, N.Y., assignor to Argus Chemical Corporation, Brooklyn, N.Y., a corporation of Delaware
Continuation-in-part of application Ser. No. 440,856, Mar. 18, 1965. This application Feb. 3, 1966, Ser. No. 533,109
Int. Cl. C07d 1/02; B01d 3/00
U.S. Cl. 260—348.5
9 Claims

ABSTRACT OF THE DISCLOSURE

A continuous process for the epoxidation of unsaturated organic compounds is provided. The unsaturated compound is blended with a per acid epoxidizing agent; the mixture is conducted through a back-mix still-pot epoxidation zone; a portion of the mixture is withdrawn from such zone, and a further amount of unsaturated compound and per acid is blended with the mixture in the back-mix still-pot epoxidation zone. The partially epoxidized product is then finished off in a nonrecirculating traverse epoxidation zone.

---

This application is a continuation-in-part of application Ser. No. 440,856, filed Mar. 18, 1965, and now abandoned.

This invention relates to a process for preparing epoxidized organic compounds such as fatty esters and fatty oils, and more particularly to a process for preparing epoxidized fatty esters and oils by oxidation using organic per acids, and to apparatus especially designed to carry out this process.

Epoxidized fatty esters and oils are now widely used as plasticizers in the synthetic resin industry, particularly for polyvinyl chloride resins. These epoxidized esters and oils have found wide favor, not only because of their plasticizing activity but because they combine with it a certain stabilizing effectiveness. In addition they are readily available, and relatively inexpensive.

A number of procedures have been described for the epoxidation of unsaturated organic compounds. Several of these prior procedures are summarized in U.S. Patent No. 2,977,374, to Phillips and Starcher, patented Mar. 28, 1961. The prior procedures referred to by this patent are general epoxidation procedures, however, and are not really applicable to fatty oils, for various reasons. The procedure of Darzens, Organic Reactions, volume 5, pages 413 to 439, is unsatisfactory because it gives only small yields, with undesirable side reactions. Pummerer and Reindel, Ber. 66B 335–9 (1933), describe a route starting with butadiene and perbenzoic acid, which is extremely limited in scope and employs a most expensive source of oxygen.

Phillips and Starcher further point out that prior procedures usually were carried out batchwise at atmospheric pressure, with control of the rate of epoxidation, a very highly exothermic reaction requiring careful control, by the rate at which the per acid reactant was fed into the vessel. Since the epoxide so produced was allowed to remain in the reaction mixture, the entire charge being retained in the vessel until the reaction was complete, there was undue exposure of excess ethylenic compound to the available per acid at temperatures above normal storage temperature, inviting decomposition, excessively long reaction times, and the like.

Phillips and Starcher accordingly developed a process for epoxidation involving introducing an ethylenic unsaturated compound and peracetic acid into an elongated reaction zone under critically controlled conditions regarding the rate of blending of the reactants, the operating pressure, residence time of the reaction mixture and the length and smallest diameter or cross-sectional area of the elongated reaction zone. The epoxidation reaction is conducted at a temperature of from about 0 to below about 150° C., with a maximum residence time not exceeding forty-five minutes, at a pressure sufficient to maintain the reaction mixture in the liquid phase.

The elongated reaction zone is in a uniform tubular form, with a certain specified cross-sectional diameter and length. This elongated reaction zone is defined in terms of length and the expression $\sqrt{4K/\pi}$, where K is the area of the figure obtained by a perpendicular cross-sectional view, taken at a point in the elongated reaction zone which represents the smallest cross-sectional area. The expression $\sqrt{4K/\pi}$ must fall between 0.5 to 5 inches, and the length is 100 to 10,000 times this value. A plurality of such zones can be employed, in series or in parallel.

Since the reaction is carried out in the liquid phase, Phillips and Starcher claim that they avoid loss of highly volatile compounds, such as propylene, butadiene and the like, and the explosion hazard in using peracetic acid at high temperatures, and that very high yields in terms of percent of available per acid utilized are obtainable, in rather short reaction times.

In seeking to avoid retention of the epoxide in the reaction mixture, rather than trying to remove it as it is formed, Phillips and Starcher encounter other difficulties. They require the use of very small diameter tubing, shown in the working examples as ⅛ to ½ inch in diameter, of a considerable length in proportion to the diameter, with consequent processing difficulties from the standpoint of a high production rate. At the same time, they add all of the peracetic acid initially, with the hazards this entails.

The process moreover is less efficient. Because of the inability to recirculate unreacted per acid or ethylene compound, or both, any imperfections in the original blend cannot be eliminated by such mixing as would normally occur in a batch process. The result is a loss in efficiency and a lower total yield, except under very carefully controlled conditions.

Because of the small pipe dimensions, the reaction is slow, and the throughput is therefore rather low, so that the flow through the pipes is in the laminar range. This prevents turbulence, which is desirable to ensure thorough mixing and a uniform reaction. This in effect limits the process to materials of a high rate of epoxidation, high enough to give a good yield at the low throughputs the process permits. There is moreover a high susceptibility to plugging of the lines where the ethylenic reaction products or starting materials are subject to polymerization.

A further problem left unresolved in the Phillips and Starcher process is the separation of the epoxidized product from the reaction mixture. This contains not only unreacted starting material, but a proportion of carboxylic acid stoichiometrically equivalent to the amount of per acid consumed in the epoxidation. This material is not easily separated. It is also important in most commercial processes to utilize the byproducts, and this means that the carboxylic acid must be recovered from the reaction mixture in a commercially usable form, but this aspect is not dealt with by Phillips and Starcher, either.

In accordance with the invention, process and apparatus are provided that are especially designed for the epoxidation of unsaturated fatty esters and oils but that can be used for epoxidation of other unsaturated organic compounds, using organic per acids, such as peracetic acid, in a manner which ensures a high yield, and which facilitates separation of the reaction mixture into the epoxidized compound such as the epoxidized ester or oil, and the lower carboxylic acid byproduct, such as acetic acid.

It will be understood that the term "fatty ester" generically includes the fatty oils, which are mixtures of glyceride esters, and therefore a subgenus of the broader class of fatty esters.

In the process of the invention, which is adapted for continuous operation, the unsaturated organic compound, such as the fatty ester or oil, for instance, soyabean oil, in a first reaction stage, is continuously blended wih organic per acid and allowed to react at a controlled rate, in a back-mix stirred-pot reaction zone from which a proportion of the reaction mixture can be continuously bled off, while another proportion is recirculated. The exothermic reaction is kept under control (1) by cooling the back-mix stirred-pot reaction zone, for example, by use of cooling coils therein, or by applying external cooling where there are no cooling means provided within the reaction zone, and/or (2) by recirculation through the back-mix reaction zone of at least a proportion of the reactants and/or (3) by blending of fresh raw reactants, and withdrawal of reaction mixture, their proportions and volume being adjustable as necessary. In this way, the reaction temperature is maintained within the range from about 30 to about 80° C., at which it is not unduly rapid. The reaction is brought to from about 30% to about 90% of completion in this stage.

After about 30% to about 90% of completion, the reaction rate slows markedly, and it becomes necessary to compensate for this by halting back mixing, which slows the reaction, in order to bring the reaction to completion. Accordingly, the reaction mixture is next transferred to an elongated nonrecirculating or traverse reaction zone, while still applying external cooling, to maintain control of temperature, in the case of fatty esters within the range from about 30° C. to about 80° C. Blending with additional raw reactant is not precluded in this zone, and may in fact be desirable, to enhance completion of the reaction. However, it is usually practical to blend all of the per acid stoichiometrically required to effect complete epoxidation in the first stage reaction zone. The reaction is brought to within 70 to 100% of completion in this stage.

If the above reaction mixture has not reached 100% completion, it is held for a time sufficient to complete the reaction. External cooling is not required in this stage, and a residence or dwell zone reactor will usually suffice. This reaction step can be omitted, if reaction is completed in the traverse reaction zone.

Thereafter, the epoxidized reaction products is separated from the byproduct, the organic acid derived from the per acid reactant, and the organic acid is also recovered.

In a preferred variation of the instant process, as applied to fatty esters, the per acid epoxidizing agent is added to the fatty ester feed in one or more incremental proportions, and two back-mix recirculating reaction zones are employed, in series, the reaction mixture continuously removed from the first back-mix recirculating zone being passed directly to the second recirculating zone, where it is blended with any further proportion of the per acid required for the desired final degree of epoxidation of the fatty oil. This second reaction zone also has a provision for continuous recirculation, if no cooling means, such as cooling coils, are provided therein, and controlled removal of a proportion of the reaction mixture. The reaction mixture then passes through the elongated nonrecirculating or traverse reaction zones, where it can be blended with further amounts of per acid, if desired, and if necessary is finally held in a residence or dwell reaction zone until reaction is complete.

Where peracetic acid is used in epoxidizing unsaturated organic compounds, the peracetic acid oxidizes the olefinic double bond to form the corresponding epoxide and acetic acid as follows:

However, the acetic acid formed as shown above can decompose the epoxide, to form the hydroxy acetic acid ester, as follows:

Accordingly, where per acids used in the epoxidation of unsaturated organic compounds are converted to acids which can degrade epoxides, for example, peracetic acid converted to acetic acid, the process of the invention may be advantageously modified by introducing into the back-mix reaction zone only a part of the per acid stoichiometrically required to epoxidize the organic compound and by passing the epoxidized mixture from the back-mix zone into an evaporation zone prior to the traverse reaction zone. The remainder of the per acid stoichiometrically required to epoxidize the organic compound is added to the reaction mixture after the evaporation step, either prior to or at the traverse reaction zone. Such an evaporation zone concentrates the reactants flowing to the traverse reaction zone, thereby appreciably increasing the rate of reaction in the traverse reaction zone, and permits removal of most of the harmful byproduct acid from the reaction mixture prior to its entering the traverse reaction zone. Furthermore, due to the use in the back-mix reaction zone of only a part of the per acid stoichiometrically required to epoxidize the organic compound, the organic compound is present in excess in the back-mix reaction zone, which avoids unnecessary degradation of the per acid. Accordingly, any reaction of the epoxide produced in the back-mix reaction zone with such acid is minimized, resulting in a product higher in epoxy number.

The evaporation preferably is effected by passing the epoxidized reaction mixture from the back-mix reaction zone or zones in a thin film over a surface heated to a temperature at which the acid and solvent, if such is used, are boiled off at the pressure applied so as to concentrate the reactants and remove most of the acid therefrom.

As a further feature, the invention provides a back-mix recirculating reaction zone composed of a cooling zone for temperature control, and an optional dwell or residence zone which ensures a residence time sufficient for reaction of from about 30 to about 90% of completion, consuming substantially all the per acid epoxidizing agent before leading the reaction mixture to the next stage.

The zone is of sufficient volume to permit the needed dwell time without slowing the rate of production or requiring an unduly long reaction zone, as well as a thorough mixing to correct any imperfection in the proportioning of the reactants at the initial blending thereof. A reaction at from about 30° C. to about 80° C. requires from 10 minutes to two hours to reach this degree of completion.

The second stage or traverse reaction zone deals with a reaction mixture that is reacting more slowly, and more time is required in this stage. Here, the reaction is brought to from 65 to preferably from 90 to 98% of completion, depending on the reactants. For this, in the case of fatty esters, from one-half to two hours will usually be required. However, if an evaporation zone is employed prior to the traverse reaction zone, and additional per acid added, for the same or less residence time, the reaction is brought preferably all the way from 65% to 98% of completion. Thus, in most cases, where an evaporation zone is employed prior to the traverse reaction zone, the rate of reaction in the traverse reaction zone increases markedly. Cooling is still required, to maintain temperature below 80° C.

The final stages of completion of the reaction, from 90 to 100%, usually occurring in the residence or dwell reaction zone, may be very slow indeed. However, in this stage cooling is not needed, and the reaction mixture can be simply allowed to react at its own rate and temperature. In this last stage, in the case of fatty esters, from two to four hours or even more may be needed, to reach from 95% to 100% of completion at 30 to 80° C.

The above-described operating time and conversion parameters, especially suited for the preferred application of the process to unsaturated fatty esters, can be summarized as follows:

in a second recovery stage. The epoxidized oil that is obtained is substantially free from low-boiling components, such as water and lower acid, and can be used without further purification, as, for instance, a plasticizer or stabilizer for polyvinyl chloride resins.

The apparatus in accordance with the invention includes, in combination, a back-mix stirred-pot mixer recirculating reactor, means for supplying organic component reactant, such as unsaturated fatty ester and per acid reactant in measured proportion to the reactor, means for cooling the reaction mixture associated therewith, means for withdrawing epoxidized reaction mixture from the reactor to, if desired, an optional second stage reactor, similarly equipped, if desired, an evaporator of the mechanically aided film still type for removal of acid and other low boiling components, a traverse or nonrecirculating reactor, such as a plug flow reactor, arranged, if desired, in a series of plug flow reactors to achieve the needed reaction time, means for cooling the reaction mixture assocated therewith, a dwell reactor, if necessary to complete the reaction, an evaporator of the mechanically aided film still type for removal of low-boiling components, combined, if desired, with a plurality of such evaporators in series to ensure complete removal of such components, and means for separately collecting the purified epoxidized organic compound, such as epoxidized fatty ester, and the low-boiling components.

The process and apparatus of the invention as applied illustratively to unsaturated fatty esters, are illustrated in the drawings, in which.

TABLE

| | Overall range of conversion, percent | Preferable range of conversion, percent | Overall range of residence time | Preferable range of residence time |
|---|---|---|---|---|
| Back mix reactor zone (when using only one stage) | 30–90 | 60–90 | 10 mins. to 2 hrs | 20 mins. to 1½ hrs. |
| Back mix reactor zone, stage No. 1 | 30–80 | 60–75 | 5–60 mins | 10–40 mins. |
| Back mix reactor zone, stage No. 2 | 60–90 | 75–90 | 5–60 mins | 10–40 mins. |
| Traverse reaction zone (plug flow reactor) | 65–100 | 90–98 | 30 mins. to 2 hrs | 45 mins. to 1½ hrs. |
| Back mix reactor zone (where evaporation zone is employed) | 30–70 | 50–65 | 5 mins. to 1½ hrs | 10 mins. to 1 hr. |
| Traverse reaction zone (where evaporation zone is employed) | 65–100 | 95–98 | 20 mins. to 2 hrs | 30 mins. to 1½ hrs. |
| Dwell residence reaction zone | 90–100 | 95–100 | ½–10 hrs | 2–4 hrs. |

A further feature of the process and apparatus of the invention provides a special technique for separation of the reaction mixture. The completed epoxidized reaction mixture is conducted in a thin film over a surface heated to a temperature at which the solvent media and lower carboxylic acid components are boiled off at the pressure applied. Reduced pressure can be applied to lower this temperature, but preferably as high a temperature and as low a contact time as possible is used, so as to ensure flash evaporation of the low-boiling components.

Two such evaporation zones can be provided, and to ensure complete removal of the low-boiling acid component, water can be added to the reaction mixture from the first evaporation zone, diluting the high-boiling components and therefore aiding in stripping of the lower acid because of the increased mole ratio of the volatile components. Any low-boiling liquid or solvent compatible with the reaction mixture can be used in place of water. Acetone is a preferred organic solvent. Other organic solvents which can be used include chloroform, carbon tetrachloride, trichloroethylene, methyl ethyl ketone and ethyl acetate.

By this technique a rather pure lower acid corresponding to the per acid can be directly recovered. An organic solvent diluent will have to be separated from the acid

Figure 1:
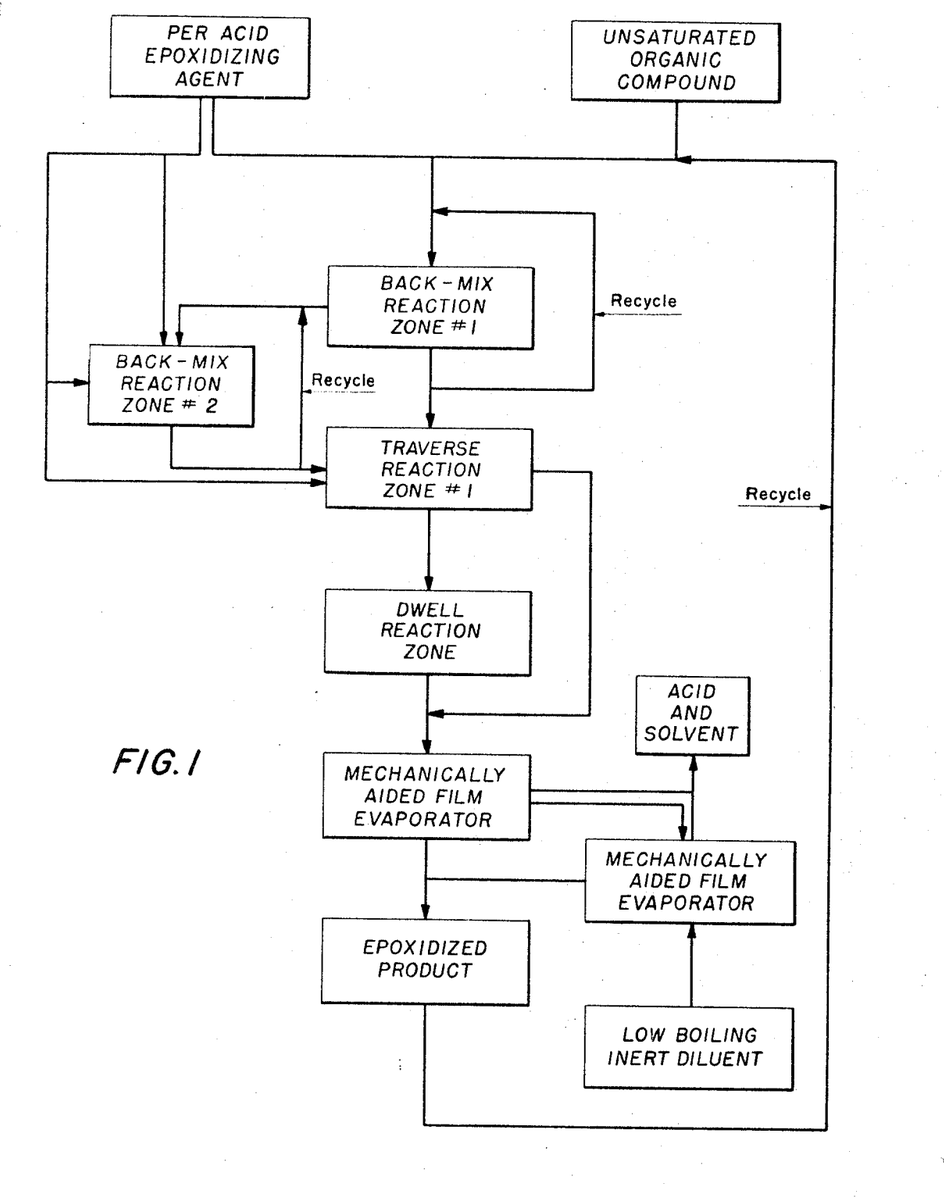
FIGURE 1 represents a flow sheet showing the combined steps of one embodiment of the process.
Figure 2:
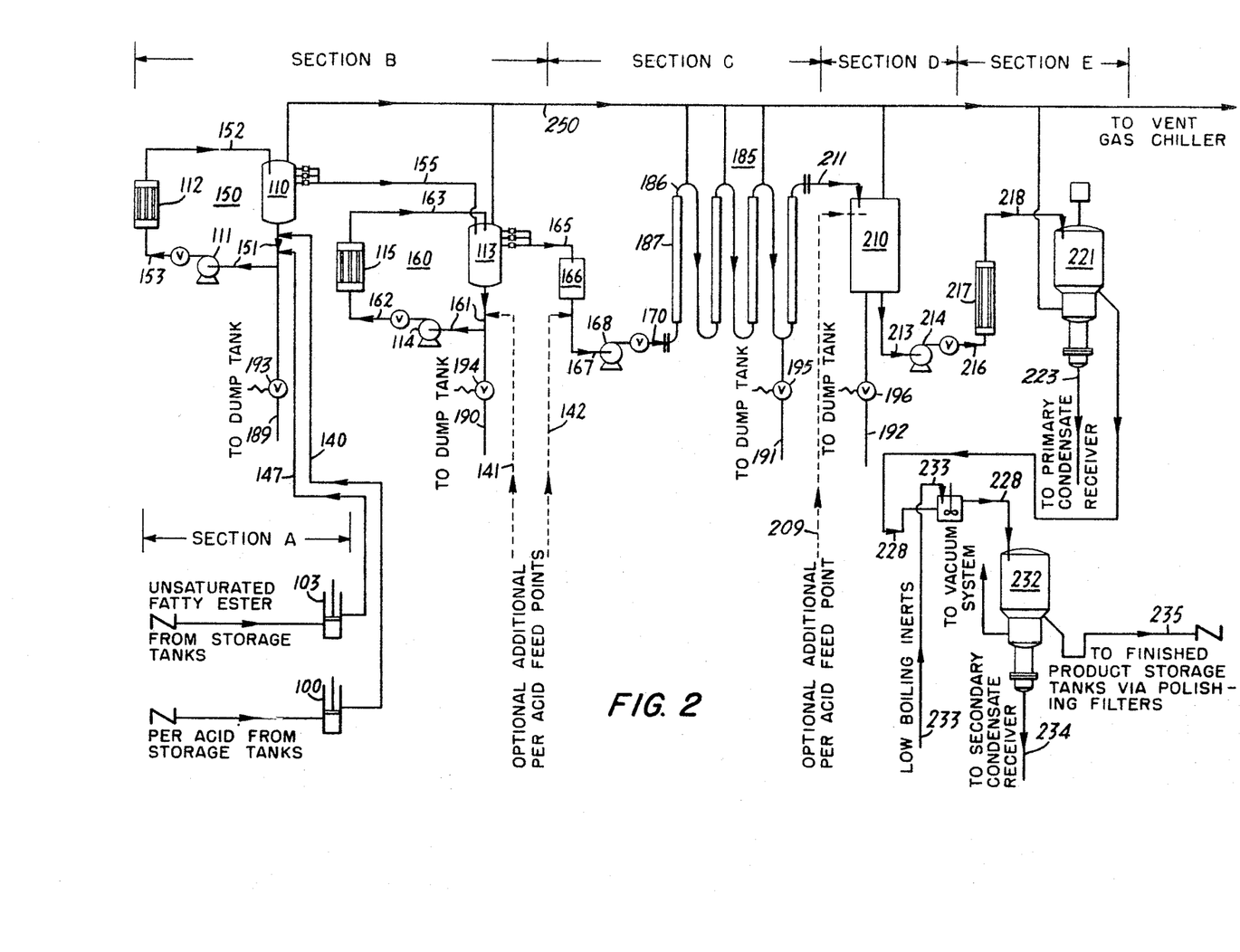
FIGURE 2 shows schematically one embodiment of apparatus for carrying out the combined process steps shown in the flow sheet of FIGURE 1.

The flow sheet of FIGURE 1 and the apparatus of FIGURE 2 are correlated, and therefore will be described together.

The reactants supply Section A of the apparatus of FIGURE 2 supplies an unsaturated fatty ester, such as soyabean oil, the metering pump 103, which feeds the oil through the line 147 to a first back-mix recirculating reaction zone 150.

Section A of the apparatus of FIGURE 2 also supplies per acid reagent to metering pump 100, which pumps the per acid through line 140 to the recirculating reaction zone 150. Usually, all of the total per acid needed for epoxidation is fed through line 140; if desired, however, a minor proportion can be reserved, and blended in at the second stage reaction zone 160 via optional line 141, or at the traverse reaction zone via line 142.

Section B of the apparatus includes two back-mix recirculating reaction zones 150, 160, in series, with associated equipment. The first reaction zone 150 is composed of a line 151 leading from the bottom of a stirred-pot reactor 110, and a second line 152 leading to the top of the reactor 110. The recirculating pump 111 draws the reactants into line 151 from lines 40, 147, and ensures continuous circulation of the reaction mixture about the closed cycle line 151, 153, 152 via reactor 110. Due to the exothermic nature of the reaction, a cooler 112 is provided in line 153, to maintain the reaction temperature within the desired range, usually from 30 to 80° C.

The reactor 110 ensures a considerable dwell time for the reaction mixture directly after the reactants from lines 140, 147 have been blended via line 151 and then cooled, and also provides for a more uniform proportioning thereof, in the event of any variations in the feed of reactants from lines 140, 147.

The direction of travel of the reaction mixture about the reaction zone is shown by the arrows. The per acid and unsaturated fatty oil are blended in the line 151, and passed downwardly to the pump 111, whence they pass through line 153 to the cooler 112, and thence via line 152 to the reactor 110. A proportion of the reaction mixture from reactor 110 is continuously led out the bottom, for recirculation about the zone via lines 151, 153, 152, after blending with further per acid and fatty oil. An equal proportion of the reaction mixture is withdrawn through line 155 to a second back-mix recirculating reaction zone 160. These proportions together with the volume of mixture in tank 110, the rate of circulation, and cooling introduced via cooler 112 are adjusted to maintain a reaction to from 30 to 80% of completion in the zone, and a reaction temperature of 30 to 80° C.

The rate of circulation through the pump 111 can be adjusted to yield proper mixing of the reactants and the desired degree of cooling.

The second back-mix reaction zone 160 is composed of the second stirred-pot reactor 113, and a line 161 leading thence down to recirculating pump 114, which pumps the reaction mixture through line 162 to a cooler 115, whence the mixture is returned via line 163 to the reactor 113.

Leading into line 161 below the reactor 113 is an optional feed line 141 for per acid reactant.

As in the first back-mix reaction zone, a proportion of the reaction mixture is recirculated through the lines 161, 163, 162, being continuously withdrawn from the bottom of the tank 113, and a further proportion is withdrawn through the line 165 leading to the second reaction stage, Section C, the traverse non-recirculating reaction zone.

In general, for an unsaturated fatty oil, the total dwell time of the reaction mixture, on the average, in the first back-mix reaction zone 150 will be from about 5 to about 60 minutes, preferably one-half hour, and the total dwell time for the reaction mixture in the second back-mix reaction zone will also be from 5 to 60 minutes, preferably one-half hour.

In the system, a vent gas chiller (not shown) can also be provided for cooling the gases vented from various parts of the system, and a condensate receiver (not shown) can be provided for receiving condensate from the chiller. These components are not essential and can be omitted.

Section C of the apparatus comprises the traverse non-recirculating reaction zone, into which line 165 leads from the second back-mix reaction zone 160 of Section B.

The line 165 leads to the second stage reactor overflow tank 166, which maintains a reserve supply of reaction mixture for this zone, in case of variations in flow in the line up to this point. From the tank 166, a line 167 leads to pump 168, which feeds reaction mixture to the zone via line 170.

The plug flow reactor 185 is made up of a plurality of tubes 186, designed in such a way so as to provide a minimum about of back mixing between the reactants and the product. The diameter or the cross section would therefore depend upon the capacity of the plant. The cooling required because of the exothermic reaction can be provided either by using jacketed pipe heat exchangers 187, as shown, or conventional heat exchangers placed intermittently.

The plug flow reactors are dimensioned to give the desired dwell time in this reaction zone of the system. This should range from one-half to two hours for fatty oils, but can range as high as five hours, if desired, in the case of a slow reaction.

The reaction temperature at this stage will be in the range from 30 to 80° C. maintained by external cooling. Preferably, the reaction temperature in the plug flow reactor is from 50 to 65° C.

From the final cooler in zone C, a line 211 leads to the top of the residence tank 210.

In the bottom of each reactor system 150, 160, 185 and 210 is provided a dump line 189, 190 191, 192 with a control valve 193, 194, 195, 196 for draining the contents of the reactors during maintenance service or emergency.

The residence tank 210 provides the fourth section reactor of the system, Section D. The capacity of the tank is such as to provide a residence time necessary to complete the continuing reaction in the reaction mixture from the previous zones. In the usual case, the residence time will be from two to four hours, but it may be as little as one-half hour, and as much as ten hours, depending upon the rate of reaction of the reactants, and the degree of completion of the reaction by the time the reaction mixture has reached this stage. An optional feed line 209 is provided for feed of some additional peracetic acid at this stage, too, if desired.

From the bottom of tank 210, a line 213 leads to pump 214, which pumps the reaction mixture into line 216, for delivery to the next zone, Section E of the apparatus.

Section E of the apparatus comprises the epoxidized oil recovery system.

The reaction mixture fed from the residence tank 210 through line 216 is at a temperature within the range from 30 to 80° C., and preferably from 50 to 65° C., a temperature too low for removal of the low-boiling volatile components, i.e., solvent, if any, and byproduct carboxylic acid, for instance, as in the case of the peracetic acid mixture referred to previously and solvents from the peracetic acid preparation process, such as acetone. Consequently, the line 216 leads to an evaporator feed pre-heater 217, which brings the reaction mixture to somewhat below the desired temperature for evaporation of the low-boiling components, i.e., a temperature within the range from about 60° C. to about 150° C. Thence, line 218 leads to the primary evaporator 221 of the mechanically-aided film still type.

Vapors of low-boiling components taken from the evaporators via line 223 are condensed and collected in the primary condensate receiver (not shown). In the case of the epoxidation as illustrated, these low-boiling components consist primarily of byproduct carboxylic acid and any solvent that may be present such as acetone. These are pumped through the condensate transfer pumps to an acid/solvent recovery plant (not shown).

The epoxidized fatty oil reaction product recovered from the primary evaporator 221 usually still contains small amounts of the higher boiling of the volatile components, such as carboxylic acid. To remove the last traces of such acid, it is led off via the line 228 to the secondary mechanically-aided film-type evaporator 232. To increase the proportion of low-boiling components in the reaction mixture, and facilitate the separation of the remaining low-boiling components, the reaction mixture can be blended with an inert low-boiling material, such as water or organic solvent via line 233.

Vapors from the secondary film evaporator 232, mostly acetic acid and acetone in the illustrative example, is led off through line 234 to a secondary condensate receiver, whence it is pumped through secondary condensate transfer pump to the acid/solvent recovery plant (not shown).

The epoxidized reaction product now is substantially free from low-boiling components. Since the reaction is quantitative, the material is substantially pure epoxidized reaction product. This material is passed through line 235 to the epoxidized product receiver tank (not shown). This product can be filtered through polishing filters and sent to the finished product storage tank. In the unlikely event that the epoxidized product has not been quantitatively epoxidized, a feed-back line can be provided to recycle the partially epoxidized product through the complete or partial reaction zone.

The reactors, 110, 113, 185, tank 210 and evaporators 221 and 232 are all connected via line 250 to the vent gas chiller, for recovery of gaseous materials liberated at any stage of the reaction.

Figure 3:
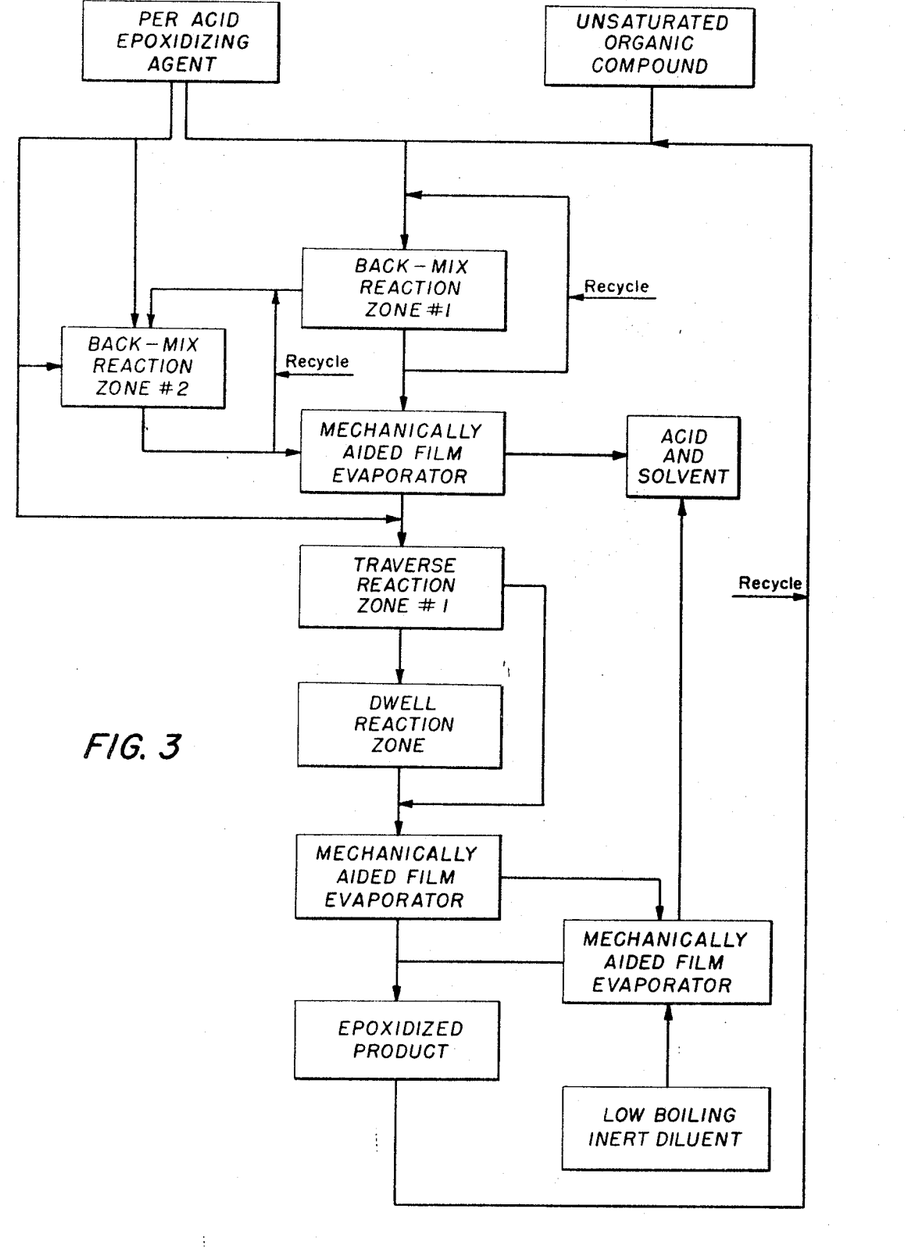
FIGURE 3 is a flow sheet that represents another embodiment of the process, modified to insert an evaporation step prior to the traverse reaction zone, to remove acid and solvent from the reaction mixture.
Figure 4:
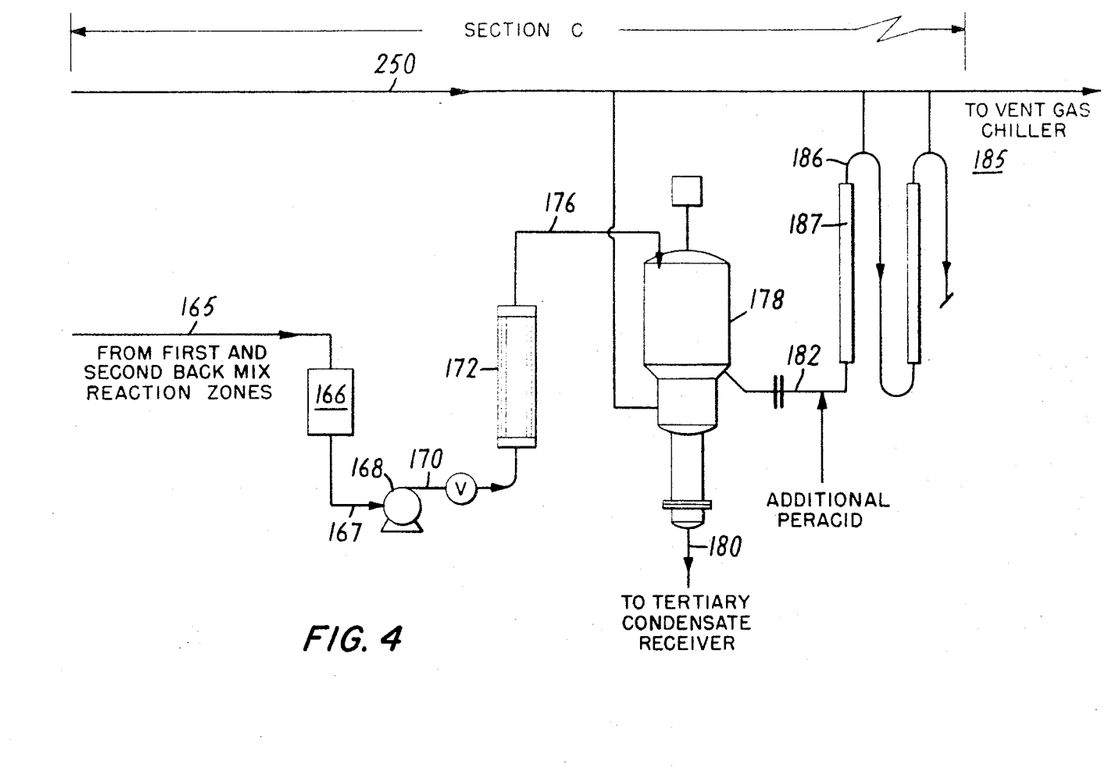
FIGURE 4 shows schematically a portion of an embodiment of the apparatus of FIGURE 2, modified to carry out the added evaporation process step shown in the flow sheet of FIGURE 3.

In the flow sheet of FIGURE 3 and the portion of the apparatus shown in FIGURE 4, which are correlated, the process and apparatus are modified by employing in the back-mix reaction zone only a part of the per acid stoichiometrically required to epoxidize the organic compound, and by inserting an evaporation step to remove free acid prior to the traverse reaction zone, to facilitate use of per acid which in the course of the reaction is converted to an acid, and thus prevent degrading the epoxide required to epoxidize the organic compound. The additional per acid stoichiometrically required to epoxidize the organic compound is thereafter added to the reaction mixture at line 182 after the evaporation step and before the traverse reaction zone. An example of such a per acid is peracetic acid, which is converted to acetic acid. In addition, the optional per acid feed point at line 167 present in FIGURE 2 has been removed from FIGURE 4. In all other respects the process and apparatus of FIGURES 3 and 4 are the same as in FIGURES 1 and 2. The per acid epoxidizing agent, for example peracetic acid, and the unsaturated fatty ester, which is the unsaturated organic compound to be epoxidized, are fed to the first back-mix recirculating reaction zone 150 via lines 140 and 147 respectively, and thereafter the reaction mixture formed in the first back-mix recirculating reaction zone 150 is fed to the second back-mix reaction zone 160 via line 155, as described hereinbefore with reference to FIGURES 1 and 2. The reaction mixture coming from the second back-mix reaction zone 160 and second stage reactor overflow tank 166 via line 167 is at a temperature within the range from 30 to 80° C., and preferably from 50 to 65° C., a temperature too low for removal of low boiling components such as acetic acid and solvent such as acetone. Accordingly, the reaction mixture is pumped via pump 168 through line 170 to an evaporator feed pre-heater 172, which brings the reaction mixture to somewhat below the desired temperature for evaporation of the low-boiling components, i.e. a temperature within the range from about 60° to about 150° C. Thence, line 176 leads to an evaporator 178 of the mechanically-aided film still type.

Vapors of low-boiling components taken from the evaporator via line 180 are condensed and collected in a tertiary condensate receiver (not shown). These low-boiling components consist primarily of acetic acid and solvent such as acetone. They are pumped through the condensate transfer pumps to an acid/solvent recovery plant (not shown).

The epoxidized fatty oil reaction product recovered from the evaporator 178 along with additional peracetic acid required for the reaction, is then fed through line 182 to the plug flow reactor 185, and the process is continued as in FIGURE 1, using the same remaining apparatus as in FIGURE 2.

The process and apparatus of the invention are applicable to the epoxidation of any ethylenically unsaturated fatty oils and fatty acid esters. Such oils and esters may have one or more ethylenically unsaturated groups per molecule. Fatty oils as is well known are usually composed of varying proportions of glycerides of organic fatty acids, including both saturated and unsaturated fatty acids, of which only the unsaturated groups present therein are epoxidized by the process in accordance with the invention. The invention accordingly is applicable to the fatty oils containing unsaturated glyceride ester components, including, for instance soyabean oil, cottonseed oil, beef tallows, sheep tallow, fish oils of various types, such as menhaden oil, codliver oil, shark oil, sperm oil, whale oil, herring oil, peanut oil, linseed oil, sunflower seed oil, safflower seed oil, coconut oil, palm oil, lard oil, perilla oil, palm kernel oil, poppyseed oil, rapeseed oil, sesame seed oil, hempseed oil, cocoa oil, acorn oil, apricot kernel oil, beechnut oil, cherry kernel oil, and corn oil, as well as to other esters of the unsaturated fatty acids and monohydric and polyhydric alcohols that may be present therein, such as esters of oleic acid, linoleic acid, linolenic acid, ricinoleic acid, crotonic acid, and isocrotonic acid, with ethylene glycol, ethyl alcohol, pentaerythritol, butyl alcohol, mannitol, sorbitol, lauryl alcohol, and stearyl alcohol.

The process of the invention is applicable to the epoxidation of any ethylenically unsaturated compound, i.e., a compound which has at least one $>C=C<$ group in the molecule. These compounds include the hydrocarbons, both straight and branched chain as well as cyclic hydrocarbons, halogenated hydrocarbons, alcohols, amines, ethers, ketones, acetals, acids, esters, nitriles, phosphorus and phosphoric esters of alcohols, amides, imides, isonitriles, organoboron compounds, organophosphorus compounds, organosilicon compounds, organotin compounds, and organoaluminum compounds.

Illustrative ethylenic hydrocarbons which can be employed as reagents in the epoxidation process include, among others, propene, butenes, pentenes, hexenes, heptenes, octenes, decenes, dodecenes, octadecenes, butadiene, isoprene, pentadienes, hexadienes, heptadienes, octadienes, decadienes, dodecadienes, octadecadienes, styrene, divinylbenzenes, dihydronaphthalenes, indene, stilbene, 1-phenyl-1-propene, 1,1-diphenylene, cyclopentenes, cyclohexenes, cyclopentadiene, dicyclopentadiene, vinylcyclohexenes, alkyl-substituted cycloalkenes, alkyl-substituted cycloalkadienes, aryl-substituted alkadienes, aryl-substituted cyclopentenes, unsaturated macromolecules such as butadiene polymers and copolymers, and the like.

Examples of alcohols and phenols containing ethylenic unsaturation therein are exemplified by compounds such as 3-cyclohexenylmethanol, p-allylphenol, p-crotylphenol, dicrotylphenols, p-(2-cyclopentenyl)phenol, 3-penten-1-ol, 5-decen-1-ol, 9-octadecen-1-ol, 2-ethyl-2-hexenol, 3-cyclopentenol, 4-cyclohexenol, alkyl-substituted alkenols, aryl-substituted alkenols, cycloalkenols, cycloalkadienols, alkyl-substituted cycoalkenols, cycloalkenyl-substituted alkanols, alkenylphenols, and the like.

Exemplary unsaturated ethers which are contemplated include, among others, diallyl ether of diphenylolmethane; diallyl ether of 2,2-diphenylolpropane; diallyl ether; butyl crotyl ether; 2-pentenyl butyl ether; 4-pentenyl butyl ether; 4-octenyl 3-pentenyl ether; ortho-allylphenyl ethyl ether; butyl 3-dodecenyl ether; 2,4-diallylphenyl ethyl ether; 3-cyclohexenylmethyl alkyl ethers; 3-cyclohexenylmethyl aryl ethers; 4-decenyl 2-propenyl ether; 1,4-pentadienyl alkyl ether; 1,4-alkadienyl alkenyl ether; and the like.

Illustrative nitrogen-containing compounds, e.g., unsaturated amides, imides, nitriles and the like, amenable as starting material include 3-pentenenitrile, 4-pentenenitrile, 4-cyanocyclohexene, ortho-, meta-, and para-vinylbenzonitrile, 3-pentenamide, 4-pentenamide, oleamide, ortho-, meta-, and para-vinylbenzamide, 3-cyclohexene-1-carboxamide, N-crotylmaleimide, N-crotylphthalimide, N-allyl phthalimide, and the like.

Among the unsaturated carbonylic compounds, e.g., unsaturated ketones, acids, esters, and the like, which can be employed in the instant process include, for example, vinylacetic acid, oleic acid, cinnamic acid, soyabean oil, linseed oil, linoleic acid, mesityl oxide, allyl acetate, allyl methacrylate, crotyl acrylate, $\alpha$-phenyl-$\beta$-pentenyl $\alpha$-benzylcrotonate, β-pentenyl α-ethyl-β-propylacrylate, octyl β,δ-pentadienoate, crotyl α-cylohexylcrotonate, 2-ethylhexyl oleate, 2-cyclopentenyl crotonate, glycol dioleate, vinyl α-ethyl-β-propyl-β-butylacrylate, 4-decenoic acid, methyl allyl ketone, methyl 2-pentenyl ketone, diallyl maleate, vinyl α-tolyl-β-ethylacrylate, 2-ethylhexyl α-methyl-β-ethylacrylate, propyl 1-cyclohexenecarboxylate, butyl α,γ-diethyl-α,γ-pentadienoate, methyl α-phenyl-α,γ-hexadienoate, tolyl β-phenethyl-γ-butyl-α,γ-heptadienoate, phenyl 1 - cyclopentenecarboxylate, tolyl 2 - methyl-1-cycloheptenecarboxylate, 2-ethylhexyl 6-methyl-3-cyclohexenecarboxylate, butyl 2 - phenyl-1-cyclohexenecarboxylate, allyl 2-benzyl-2,3-epoxyhexanoate, 3-cyclohexenylmethyl acetate, 3-cyclohexenylmethylacrylate, 3-cyclohexenylmethyl acylates, ethylene glycol bis(2-butenoate), propylene glycol bis(acrylate), 1,5-pentanediol bis(2-butenoate), 1,3-butylene glycol crotonate 2,3-epoxybutyrate, ethylene glycol methacrylate 2-methyl-2,3-epoxypropionate; aryl, alkenyl, cycloalkyl, cycloalkenyl, alkaryl, alkyl, and aralkyl alkenoates; aryl, alkenyl, cycloalkyl, alkyl, cycloalkenyl, alkaryl, and aralkyl alkadienoates; aryl, alkyl, alkenyl, cycloalkyl, cycloalkenyl, alkaryl, and aralkyl cycloolefin-1-carboxylates; alkylene glycol bis(2-alkenoates); alkylene glycol 2-alkenoate 2,3-epoxyalkanoates; and the like.

Illustrative mono-unsaturated acetals include, for example, 1,2,5,6 - tetrahydrobenzaldehyde diethyl acetal, paravinylbenzaldehyde dibutyl acetal; the dialkyl acetals of alkenals, such as the dimethyl, diethyl, dipropyl, diisopropyl, dibutyl, dihexyl, di-2-ethylhexyl, didecyl, etc., acetals of unsaturated aliphatic aldehydes, for example, 2-, 3-, 4-, etc., alkenals, and the like.

Typical unsaturated phosphoric esters which can be employed include, among others, di-(2-butenyl) 2-ethylhexyl phosphate, tri-(crotylphenyl) phosphate, allyl diphenyl phosphate, dioctyl 3-pentenyl phosphate, and the like.

The unsaturated halogenated hydrocarbons amenable as starting material are those which do not contain halogen atoms joined directly to the ethylenic carbon atoms $>C=C<$. A particularly preferred class of unsaturated halogenated hydrocarbons are the aliphatic haloalkenes, e.g., aliphatic chloroalkenes which contain from three to ten carbon atoms in the alkene chain and in which no more than two of the carbon atoms alpha to the ethylenic group, $>C=C<$, contain but a single halo substituent thereon.

Illustrative unsaturated halogenated hydrocarbons which can be employed include allyl chloride, crotyl chloride, 1,4-dichloro-2-butene, 3,4-dichloro-1-butene, 3-chloro-1-butene, 2-chloro-3-pentene, 2-ethyl-2-hexenyl chloride, methallyl chloride, crotyl fluoride, crotyl bromide, ortho-, meta-, and para-chlorostyrene, ortho-, meta-, and para - chloromethylstyrene, 1-chloro-3-vinylcyclohexane, 4 - (trichloromethyl)-1-cyclohexene, tetra(chloromethyl) ethylene, 1-chloro-4-fluoro-2-butene, parabromobenzylethylene, and the like.

The preferred per acid epoxidizing agent is peracetic acid. This material is available and the available commercial grades can be employed without difficulty. Other per acids can be used, such as performic acid, perpropionic acid, perbutyric acid, and perbenzoic acid.

A preferred peracetic acid reactant is obtained in accordance with the process of British Patent No. 547,333, wherein acetaldehyde is reacted with oxygen in the vapor phase at temperatures of the order of 120 to 180° C., in a ratio of at least eight moles of acetaldehyde to one mole of oxygen, using an aluminum reactor. The acetaldehyde and oxygen reaction mixture is then passed to a fractionating column, to which a suitable solvent such as acetone, methylal or methyl or ethyl acetate is fed to dissolve the peracetic acid in conjunction with acetic acid, which is also formed to some extent in the reactor. Unreacted acetaldehyde is fed back to the reactor, and a reaction product composed of a mixture of peracetic acid and acetic acid in the solvent is obtained, in which the mole ratio of peracetic acid to acetic acid is of the order of 2 to 2.5 to 1. This product can be used directly as the epoxidizing agent in the process of the invention, without the necessity of separating either the acetic acid or the solvent, inasmuch as these are readily separated later on, in the working up stage of the process. As has been stated, the carboxylic acid corresponding to the per acid is produced as a byproduct of the epoxidation, and it makes no difference that a little more carboxylic acid is present as an impurity with the per acid starting material.

Another procedure for the preparation of peracetic acid is described in British Patent No. 956,607. In this procedure, the reaction between acetaldehyde and oxygen in the vapor phase is carried out in the presence of the solvent for peracetic acid, in a proportion of at least 17.5% by weight. This patent discloses as solvents methylal, acetone, methyl acetate, ethyl acetate and methylene chloride, but acetone is the preferred solvent. The reaction temperature corresponds to the boiling point of the acetaldehyde-solvent mixture that is employed, and the solvent preferably does not boil at more than 80° C. The reaction mixture obtained from this process, a mixture of peracetic acid, acetic acid and solvent, also can be used directly as the epoxidizing agent in the process of this invention.

The epoxidation reaction can be carried out at any temperature within the range from about 30 to about 150° C. and preferably from about 30 to about 80° C., but more preferably is carried out at a temperature within the range from about 50 to about 65° C. The reaction temperature is in any case below that at which the unsaturated raw material and the epoxidation reaction product are decomposed or polymerized.

The time during which the unsaturated reactant is allowed to remain in contact with the epoxidizing agent is to a certain extent dependent upon temperature. In general, the higher the reaction temperature, the shorter the total traverse and dwell time that is desirable. Moreover, the traverse and dwell time in each of the reaction stages is dependent upon the amount of per acid that is reacted with the unsaturated reactant in each stage.

In the first reaction stage, it is normally desirable to react the unsaturated reactant with from 100 to 150 mole percent, preferably from 105 to 125 mole percent, of the per acid stoichiometrically required to epoxidize the unsaturated ethylenic groups in the reactant, and the time accordingly will be within the range from about 10 minutes to about 2 hours, preferably from about 20 minutes to about 1.5 hours. In the second reaction stage, optionally, from about 2.5 to about 25 mole percent additional per acid can be added, if desired, and the time will be within the range from about 30 minutes to about 2 hours, preferably from about 45 minutes to about 1½ hours. In the third reaction stage, the residence time will be from about ½ hour to about 10 hours, preferably from about 2 to about 4 hours.

However, where an evaporation zone is employed after the first reaction stage, it is desirable in the first reaction stage to react the unsaturated reactant with from 50 to 75 mole percent, preferably from 65 to 70 mole percent, of the per acid stoichiometrically required to epoxidize the unsaturated ethylenic groups in the reactant, and the time accordingly will be within the range from about 5 minutes to about 1½ hours, preferably from about 10 minutes to about 1 hour. In the second reaction stage, i.e. the traverse reaction zone, from about 20 to about 80 mole percent additional per acid is added, and the time will be within the range from about 20 minutes to about 2 hours.

In all cases, the mole percent of per acid is based on the per acid component of the epoxidizing agent mixture, when other impurities, such as acetic acid and solvent, are present.

The reaction is carried out under a pressure sufficient to maintain all of the components of the reaction mixture in the liquid phase. Atmospheric pressure is usually adequate. The lowest boiling component of the mixture will normally be the solvent that may be present with the per acid, such as, for instance, acetone. Since this solvent, in some cases, has a boiling point not exceeding 80° C., a reaction temperature in excess of this will require the application of external pressure to maintain the solvent in the liquid phase. Thus, the reaction pressure will normally be within the range from atmospheric to not in excess of 50 atmospheres, but of course the pressure required is in no way critical, and, as has been stated, will depend upon the boiling point of the low-boiling component in the mixture.

The rate of reaction can be controlled to a certain extent by controlling the dilution of the per acid in the reaction mixture. The diluting components include the fatty oil itself, carboxylic acid, and any solvent that may be present from the process for producing the per acid. Any organic solvent also can be added, to the desired concentration of peracetic acid. Solvents that can be used include acetone, which is preferred ethyl acetate, methylene chloride, methylal, and methyl acetate.

A rapid reaction is obtained using peracetic acid reagents comprising from about 5 to about 40% of peracetic acid. Preferably, the proportion of peracetic acid is from 15 to 25 weight percent of the reagent. The solvent that is employed should not be reactive with peracetic acid. Thus, solvents containing active hydrogen as well as water itself are excluded, although water can be added after epoxidation is complete to aid in separation of the components.

The equipment that is used should be made of or surfaced with a material that is inert to peracetic acid and to the other components of the reaction mixture. Aluminum is a preferred material. Stainless steel can also be used, as well as metals coated with an inert plastic coating, such as polytetrafluoroethylene, polypropylene, polyethylene, butadiene-acrylonitrile copolymers, Viton A, polytrifluorochloroethylene.

The following examples in the opinion of the inventor represent preferred embodiments of the invention.

EXAMPLE 1

Using the apparatus shown in FIGURE 2, an epoxidation grade of soyabean oil (specific gravity 0.925, solidification point 0–15° C., acid value 1.2, saponification value 191, iodine value 136, Reichert-Meissl value 2.3) was continuously blended with a mixture of peracetic acid, acetic acid and acetone, (15.5 weight percent peracetic acid, 17.0 weight percent acetic acid and about 67.5 weight percent acetone), as obtained directly from the reaction system under the conditions of Example 1 of British patent specification No. 956,607, and recirculated in the first back-mix stirred pot reaction zone 150 shown in FIGURE 2.

The proportion of the two reactants, namely peracetic acid and soyabean oil, was kept at 1.15 moles to 1.0 mole, respectively. The temperature was maintained at 60° C. by recirculation through the heat exchanger. The amount of the reaction mixture continuously bled off from the reactor was equal to the total amount of reactants fed at 32 gallons per hour. The average total traverse and dwell time in the first reaction zone was 0.206 hour, and the total volume of reaction mixture in the zone, including that being recirculated, was 6.64 gallons.

The reaction mixture entering the second zone 160 was found by analysis to contain 4.10% peracetic acid and epoxidized soyabean oil of iodine number 35.9 and epoxy value 5.44. This reaction mixture was then circulated about the second back-mix stirred pot reaction zone 160, with the temperature maintained at 60° C. Here a traverse and dwell time of 0.35 hour reduced the iodine number of the oil to 17.7. The reaction mixture was then continuously led to the traverse non-recirculating reaction zone 185 at a traverse time of 1.0 hour, at 60° C. It was then held in the residence tank 210 at 55° C. for 4.0 hours. The reaction mixture from this tank contained only about 1.06 weight percent peracetic acid, and epoxidized soyabean oil of iodine number 1.50 and epoxy value 6.78.

This reaction mixture was fed to the primary film evaporator 221 after having first been preheated to 67° C., and acetone and acetic acid flashed off at a film temperature of 145° C. The reaction mixture recovered from the evaporator contained only 2.36% acetic acid, and 5.0% acetone. To each volume of the reaction mixture, there was then added 0.05 volume of water and the mixture subjected to a secondary flash evaporation in the second film evaporator 232, this time at a temperature of 161° C. In this evaporation stage, substantially all of the acetic acid was removed. The final product had the following analysis:

Iodine number ________________________________ 0.68
Epoxy value _________________________________ 6.74
Acid number _________________________________ 1.37

The results showed that the yield of epoxidized soyabean oil was substantially quantitative, based on the initial soyabean oil charged.

EXAMPLE 2

Example 1 was repeated, substituting linseed oil for the soyabean oil, at a reaction temperature of 50 to 65° C. A substantially quantitative yield of epoxidized linseed oil was obtained.

EXAMPLE 3

Example 1 was repeated, substituting corn oil for the soyabean oil, with substantially equivalent results.

EXAMPLE 4

Example 1 was repeated, employing cottonseed oil in place of soyabean oil, at a reaction temperature of 50 to 65° C. A quantitative yield of epoxidized cottonseed oil was obtained.

EXAMPLE 5

Using the apparatus shown in FIGURE 2, hexadecene-1 (specific gravity 0.784, melting point 4° C., B. Pt. 274° C., refractive index 1.4441, iodine number 113) was continuously blended with a mixture of peracetic acid, acetic acid and acetone (20.2 weight percent peracetic acid 24.4 weight percent acetic acid, and the rest acetone) obtained as described in Example 1, above. The proportion of the two reactants, namely peracetic acid and hexadecene, was kept at 1.30 moles to 1.0 mole, respectively. The temperature in all steps of reaction was maintained at 60° C. The flow rate was chosen at 3.9 gallons per hour, to provide 2.15 hours of residence time in the first back-mix stirred pot reactor, 4.02 hours in the second back-mix stirred pot reactor, and 8.25 hours in the plug flow reactor. The dwell tank was not needed, and therefore not used in this case. The conversion obtained at the end of 1st back-mix, 2nd back-mix and the plug flow, was observed to be 80.5%, 89% and 96% completion, respectively. The reaction mixture was then directly sent through a primary and a secondary film evaporator, using the same procedure as described in Example 1, above. The iodine number of the 1,2-epoxyhexadecane on analysis was found to be 4.5.

EXAMPLE 6

Using the apparatus shown in FIGURE 4 without the dwell tank 210, an epoxidation grade of soyabean oil (specific gravity 0.925, solidification point 0–15° C., acid value 1.2, saponification value 191, iodine value 138, Reichert-Meissl value 2.3) was continuously blended with a mixture of peracetic acid (21.7 weight percent), acetic acid (8.7 weight percent) and acetone (69.6 weight percent), and recirculated in the first and second back-mix stirred pot reaction zone 150 and 160 shown in FIGURE 2.

The proportion of the two reactants, namely soyabean oil and peracetic acid, was kept at 1.45 moles to 1.0 mole, respectively. The temperature was maintained at 69° C. by recirculation through the heat exchanger. The amount of the reaction mixture continuously bled off from the first reactor was equal to the total amount of reactants fed at 32 gallons per hour. The average total traverse and dwell time in the first and second back-mix reaction zones were 1.7 minutes and 3.3 minutes, respectively. The analysis of the reactant coming out of the second back-mix reaction zone 160 at a steady rate showed a peracetic acid concentration of 1.13% and epoxidized soyabean oil of iodine number of 46.1 and epoxy value at 4.96.

The stream coming out of the second back-mix reactor was sent to a mechanical aided film evaporator 178 where most of the acetone and acetic acid was removed. The residue from here was mixed with further amounts of peracetic acid in such a proportion so as to give an overall molar excess of peracetic acid to soyabean oil of only 1.02. This reaction mixture was then lead to the traverse non-recirculating reaction zone 185 at a traverse time of 35 minutes at 70° C. The product from the traverse reaction zone had the desired iodine number of 1.37 and epoxy number of 7.10, and was sent directly to the primary film evaporator 221 and secondary film evaporator 232 for purification and recovery of epoxidized soyabean oil.

The results showed that the yield of epoxidized soyabean oil was substantially quantitative, based on the initial soyabean oil charges.

EXAMPLE 7

Example 6 was repeated at a reaction temperature of 60° C. The total residence time allowed for the first two back-mix reactors and the traverse zone reactor was 16.0 minutes, 16.3 minutes, and 89 minutes, respectively. The product from the traverse zone reactor had an epoxy number of 7.00 and iodine number of less than 1.0.

EXAMPLE 8

Example 1 was repeated with the exception that to the reaction mixture recovered from the primary film evaporation 221, there was added 0.2 volume of acetone, as an inert liquid (instead of water as used in Example 1), and the mixture subjected to a secondary flash evaporation in the second film evaporator 232 at a temperature of about 160° C. In this stage, substantially all low boiling components, such as acetic acid, were removed leaving an epoxidized soyabean oil substantially free from such low boiling components.

Having regard to the foregoing disclosure, the following is claimed as the inventive and patentable embodiments thereof:

1. A continuous process for the epoxidation of ethylenically unsaturated organic compounds in organic non-aqueous medium, which comprises blending the ethylenically unsaturated compound with a per acid epoxidizing agent in an amount to epoxidize the compound, conducting the mixture through a first reaction zone, withdrawing at least a portion of the reaction mixture, and passing it through a second reaction zone, blending a further amount of ethylenically unsaturated compound and per acid corresponding approximately in amount to the amount of reaction mixture withdrawn from the first reaction zone, while maintaining the mixture within the two reaction zones at a temperature within the range from about 30 to about 150° C., and recovering the epoxidized compound from the reaction mixture from the second reaction zone.

2. A continuous process in accordance with claim 1 wherein the amount of per acid blended with the ethylenically unsaturated compound is within the range from about 50 to about 75 mole percent of the amount stoichiometrically required to epoxidize the organic compound, and including the steps of reducing the reaction mixture withdrawn from the first reaction zone to a thin film of relatively large surface area, while maintaining the mixture at a temperature within the range from about 60 to about 200° C., to flash off components boiling at such temperature, introducing additional per acid into the reaction mixture from the evaporation step, and passing the mixture through the second reaction zone.

3. A continuous process in accordance with claim 1, wherein the ethylenically unsaturated organic compound to be epoxidized is an unsaturated fatty ester and the per acid epoxidizing agent is used in an amount up to about 175 mole percent of the amount stoichiometrically required to epoxidize the ester, and including the step of passing the withdrawn portion of the reaction mixture from the first and second reaction zones to and through a dwell reaction zone while maintaining the mixture within the zones at a temperature within the range from about 30° C. to about 80° C.

4. A continuous process in accordance with claim 3, wherein the fatty ester is soyabean oil.

5. A continuous process in accordance with claim 3, including the steps of reducing the reaction mixture from the dwell zone to a thin film of relatively large surface area, while maintaining the mixture at a temperature within the range from about 80 to about 150° C., to flash off components boiling at such temperature, and recovering an epoxidized ester product having a low content of such low boiling components.

6. A continuous process in accordance with claim 5 wherein the amount of per acid blended with the unsaturated fatty ester is within the range from about 50 to about 75% mole percent of the amount stoichiometrically required to epoxidize the ester, and including the steps of reducing the reaction mixture withdrawn from the first reaction zone to a thin film of relatively large surface area, while maintaining the mixture at a temperature within the range from about 60 to about 200° C., to flash off components boiling at such temperature, introducing additional per acid into the reaction mixture from the evaporation step, and passing the mixture through the second reaction zone.

7. A continuous process in accordance with claim 1, including the step of passing the withdrawn portion of the reaction mixture from the first reaction zone and second reaction zone through a dwell reaction zone, while maintaining the temperature within the three zones within the range from about 30 to about 150° C., thereafter reducing the reaction mixture withdrawn from the dwell zone to a thin film of relatively large surface area, while maintaining the mixture at a temperature within the range from about 60 to about 200° C., to flash off components boiling at such temperature, and recovering an expoxidized product having a low content of such low boiling components.

8. A continuous process in accordance with claim 1, including the steps of reducing the reaction mixture from the second reaction reaction zone to a thin film of relatively large surface area, while maintaining the mixture at a temperature within the range from about 60 to about 200° C., to flash off components boiling at such temperature, and recovering an epoxidized product having a low content of such boiling components.

9. A continuous process for the epoxidation of fatty esters and fatty oils in organic non-aqueous medium, which comprises blending the fatty ester or fatty oil with a per acid epoxidizing agent in an amount to epoxidize the compound, conducting the mixture through a first reaction zone, withdrawing at least a portion of the reaction mixture, and passing it through a second reaction zone, blending a further amount of fatty ester or fatty oil and per acid corresponding approximately in amount to the amount of reaction mixture withdrawn from the first reaction zone, while maintaining the mixture within the two reaction zones at a temperature within the range from about 30 to about 150° C., and recovering the epoxidized compound from the reaction mixture from the second reaction zone.

References Cited

UNITED STATES PATENTS

| | | | |
|---|---|---|---|
| 2,692,271 | 10/1954 | Greenspan et al. | 260—348.5 |
| 2,938,040 | 5/1960 | Skinner et al. | 260—348.5 |
| 2,977,374 | 3/1961 | Phillips et al. | 260—348.5 |
| 3,037,060 | 5/1962 | Dege | 203—89 |

FOREIGN PATENTS 650,902   10/1962   Canada.

OTHER REFERENCES

Distillation, ed. Arnold Weissberger, vol. IV of Technique of Organic Chemistry, 1951, pp. 532–539.

Organic Chem., vol. IV (1953), "Oxidations by Organic Per Acids (the Prileshajew Reaction)," by Gilman, pp. 1162–1164.

HENRY R. GILES, Primary Examiner

S. D. WINTERS, Assistant Examiner

U.S. Cl. X.R.

23—260; 203—88, 89